United States Patent
Kästle et al.

(10) Patent No.: US 6,922,114 B2
(45) Date of Patent: Jul. 26, 2005

(54) OPERATING METHOD AND SYSTEM FOR THE RESONANT OPERATION OF HIGH-PRESSURE LAMPS IN LONGITUDINAL MODE

(75) Inventors: Herbert Kästle, Traunstein (DE); Klaus Stockwald, München (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 76 days.

(21) Appl. No.: 10/704,535

(22) Filed: Nov. 12, 2003

(65) Prior Publication Data

US 2004/0095076 A1 May 20, 2004

(30) Foreign Application Priority Data

Nov. 19, 2002 (DE) .......................................... 102 53 904

(51) Int. Cl.$^7$ ................................................. H03C 1/50
(52) U.S. Cl. ....................... 332/153; 332/149; 332/167; 332/120
(58) Field of Search ................................. 332/153, 149, 332/167, 169, 161, 120, 117; 315/194, 137, 209 R, 363

(56) References Cited

U.S. PATENT DOCUMENTS

| | | | |
|---|---|---|---|
| 6,184,633 B1 | 2/2001 | Kramer | 315/246 |
| 6,400,100 B1 | 6/2002 | Kramer | 315/291 |
| 6,437,517 B1 * | 8/2002 | Kramer | 315/246 |
| 6,788,077 B2 * | 9/2004 | Hamdan | 324/726 |
| 2002/0041165 A1 | 4/2002 | Cammack | 315/291 |

FOREIGN PATENT DOCUMENTS

WO    WO 02/09480    1/2002

OTHER PUBLICATIONS

European Patent Office Search Report (referencing all documents listed above) dated Mar. 23, 2004.

* cited by examiner

Primary Examiner—Tuyet Thi Vo

(57) ABSTRACT

The operating method is based on the simultaneous application of FM and AM, and is distinguished by passing through three operating states, specifically a warm-up phase, an impressing phase and the continuous operation.

In the warm-up phase, the f002_hor is selected as fundamental frequency of the AM, or an AM is dispensed with. The impressing phase is distinguished by a temporally changing AM deviating from the conditions of the continuous operation and having an AM degree different from zero. In the continuous operation, constant conditions of the AM in the case of which the f002_hor is reached as fundamental frequency of the AM, and the AM degree is at 20 to 25% are characteristic.

11 Claims, 2 Drawing Sheets

OPERATING METHOD AND SYSTEM FOR THE RESONANT OPERATION OF HIGH-PRESSURE LAMPS IN LONGITUDINAL MODE

TECHNICAL FIELD

The invention proceeds from an operating method and a system for the resonant operation of high-pressure lamps in longitudinal mode in accordance with the preamble of claim 1. In particular, it relates to high-pressure discharge lamps with a ceramic discharge vessel, preferably with an aspect ratio of at least 1.5.

BACKGROUND ART

WO 02/09480 has already disclosed an operating method and a system for the resonant operation of high-pressure lamps in longitudinal mode. Specified there is a method for finding the second longitudinal acoustic resonant frequency. It assumes that during the continuous sweeping of the frequency range including the longitudinal mode the resonant frequency in the vertical operating position can be found by an occurrence of a relative increase in the operating voltage of the lamp. It emerges that the longitudinal frequency for a segregated arc state is found in vertical resonance with the aid of this method, and then maintained. However, depending on the composition of the metal halide filling and the timing of the expiry of the search procedure, this frequency thus found can be established far too high, and so an excitation of the acoustic resonance at the frequency found with the aid of the abovementioned method produces an inadequate mixing and does not eliminate the segregation satisfactorily. However, it is expensive to implement in an electronic ballast.

DISCLOSURE OF THE INVENTION

It is an object of the present invention to provide an operating method and a system for the resonant operation of high-pressure lamps in longitudinal mode, using a high-frequency carrier frequency that is frequency-modulated by means of a sweep signal generator, the frequency of the sweep signal being derived from the first azimuthal and radial modes and being simultaneously amplitude-modulated, a controller setting the fundamental frequency of the AM signal, the fundamental frequency of the AM being derived from the second longitudinal mode, which method ensures optimal mixing even in vertical operation. A further object is to reliably find a targeted acoustic resonance in each operating position. A further object is to specify an associated system therefor.

This object is achieved by the following means:

after ignition of the lamp three operating states are passed through sequentially:
a) a warm-up phase, for which f002_hor is selected as fundamental frequency of the AM, or an AM is dispensed with;
b) an impressing phase that is distinguished by a temporally changing AM deviating from the conditions of the continuous operation and having an AM degree different from zero; and
c) a continuous operation with constant conditions of the AM, in the case of which the f002_hor is reached as fundamental frequency of the AM, and the AM degree is at 20 to 25%.

Particularly advantageous refinements are to be found in the dependent claims.

The operating method according to the invention is designed such that the second longitudinal resonance of the horizontal operating position is always excited from the very first in the continuous operation, because it is possible thereby to achieve an optimal mixing of the filling constituents, above all the metal halides, even in a nonhorizontal operating position. Color effects and color scattering are thereby largely avoided. This must be impressed in a delayed manner on the system after observance of a certain period of grace. This mode of procedure permits a reliable build up to the optimal resonance, specifically the $2^{nd}$ longitudinal acoustic resonance f002 of the horizontal operating position. The method is suitable chiefly in the case of ceramic high-pressure lamps with an aspect ratio (length: diameter) of at least 1.5, preferably >2 during HF sweep operation in order to suppress segregation and for the purpose of improved mixing of the metal halide-arc plasma.

It emerges that the best mixing is performed when even in a nonhorizontal, in particular vertical, position excitation is initially performed in the warm-up phase under the same resonance conditions as for the resonance in the horizontal operating position. No segregation can occur in the latter case.

According to the invention, an improved method, which is more reliable by comparison with WO 02/09480 is proposed that can be implemented more easily and less expensively in electronic ballasts (EBs).

The position of the resonance f002 in the horizontal operating position is determined as a first step. It can be performed by various methods in advance or online during operation of the lamp, for example by measuring the lamp impedance during operation of the lamp, with rectangular current injection and a superimposed sinusoidal signal with an amplitude component of the sinusoidal component of 5–15% upon variation of the frequency of the sinusoidal signal.

It is assumed that a narrow tolerance range obtains for the inner length given a prescribed geometry of the discharge vessel. It constitutes that dimension of the lamp which defines the $2^{nd}$ longitudinal acoustic resonance that must be excited for an optimal mixing of the arc plasma, in particular in a vertical operating position.

In a vertical operating position, the demixing results in greatly changed speeds of sound which have the effect that after the lamp has been run up the acoustic $2^{nd}$ longitudinal resonance (f002_vert) is clearly shifted with reference to the horizontal operating position (such as f002_hor)—mostly toward higher frequencies. Over the course of time, this resonant frequency then changes during a correct operating mode, which achieves a gradual mixing, until it once again corresponds to that in the case of horizontal operation f002_hor.

Because of the segregation set up chiefly during vertical operation, deviations are to be seen in the effective speed of sound of up to 30%, mostly of about 10 to 25% in relation to higher values by comparison with the mixed state in a horizontal operating position. For example, deviations of ca. 15 to 20% in the speed of sound for Hg/Ar buffer gas mixtures are found by comparison with the mixed operation. A concrete measured value was situated at 550 m/s by comparison with 464 m/s.

The acoustic resonant frequency of the ith longitudinal acoustic resonance is given in general by:

$$f_{00i} = i \cdot c l / (2 \cdot L).$$

For i=2 (second acoustic resonance) it therefore holds that: $f_{002} = cl/L$.

The sweep operation is executed preferably in ramp form with rising frequency, with typical sweep rates of 100 s$^{-1}$ to 1 000 s$^{-1}$ in a fashion centered between the first azimuthal and the first radial acoustic resonance.

For azimuthal acoustic resonances, the following relationship holds between tube radius R and an effective (azimuthally active) speed of sound $C_{az}$:

$f_{i00}=a_{i0}\, c_{az}/(2*\square*R)$, where $a_{i0}$ i=1, 2, . . . Bessel coefficient $a_{10}=1.84$; $a_{20}=3.05$; $a_{30}=4.2$ etc.

For the radial acoustic resonances, the following relationship holds for the tube radius R and an effective, radially active speed of sound $c_r$:

$f_{0i0}=a_{0i}\, c_r/(2*\square*R)$; where $a_{0i}$ i=1, 2, . . . Bessel coefficient $a_{01}=3.83$; $a_{02}=7.016$; etc.

The electric power fluctuations forming are decisive for exciting these acoustic resonances in the closed, approximately cylindrical lamp bulbs. This means that on excitation with sinusoidal current waveforms of frequency $f_I$, the power frequency $f_P$ has the frequency: $f_P=2*f_I$.

The resonant frequency of the second longitudinal resonance is therefore given by $f002=c_I/L$, in which case $c_I$ is the speed of sound:

$$c_I=(R*\kappa*T/M)^{1/2},$$

with R: general gas constant, κ: compressibility, T: mean plasma temperature, M: mean molar mass of the plasma gas; L=axial length of the discharge vessel.

The invention proceeds from a carrier frequency in the HF range typical for lamp applications, for example 50 kHz, on which a sweep frequency is impressed as FM modulation, the value thereof being selected from a range that extends from the first azimuthal up to the first radial resonance. Preference is given to a value that is in the vicinity of the mean value, in particular directly at the mean value, between the two resonances. A reference point is a sweep deviating by up to 10% from the carrier frequency. The sweep rate is typically in the range from 100 to 1 000 Hz. After observance of a period of grace (warming up of the lamp), if appropriate, there is impressed thereon an amplitude modulation whose fundamental frequency is the $2^{nd}$ longitudinal resonance f002 in a horizontal operating position.

It emerges that here the resonance frequencies in the case of the internal burner dimensions (a typical value being 12 to 24 mm) used here are displaced by up to 5 kHz by comparison with the horizontal or mixed condition. The mode of procedure described here leads reliably to the desired mode of operation.

A plurality of embodiments are suitable as approaches to reliably setting up a best possible mixture of the arc plasma and a thorough elimination of the segregation. A plurality of operating methods for setting up the $2^{nd}$ horizontal longitudinal resonance f002, which best effects mixing, in any desired operating position, preferably during sweep operation at about 0.9 to 1.1×(f100+f010)/2 will be specified here further below. This sweep range corresponds approximately to a window of 5 kHz (~10%×(f100+f010)/2)) upwards and downwards.

Preconditions for this are, firstly, the determination and storage of the position of the $2^{nd}$ longitudinal resonant frequency f002 in the horizontal operating position that is virtually always already mixed. In order to set up a fundamental operation with this frequency, the geometry/buffer gas combination must be characterized and investigated with reference to the acoustic resonances such that the $1^{st}$ azimuthal resonance f100 and the $1^{st}$ radial resonance f010 or the mean value thereof are also known in addition to the $2^{nd}$ longitudinal resonance f002.

It emerges that in a first embodiment it is possible to implement a procedure for settling into the most favorable mixed operating state by virtue of the fact that, after the ignition of the arc discharge, the fundamental frequency fAM of the amplitude modulation AM is set to a value of 1.15 to 1.25 times the frequency f002_hor but observing a warm-up phase (up to the instant t1) of 30 to 80 seconds, preferably about 60 seconds, within an impressing phase of ca. >60 to ca. 150 seconds. The AM can be selected beforehand at will, but it is preferred to preset f002_hor. Again, the AM degree can be set at will in advance in a range from 0 to 25%. At the instant of the raising of the fundamental frequency in the impressing phase, a frequency raised by 18–20% by comparison with f002_hor may be preferred in this case, the AM degree is set to 15 to 30%. It is preferred in this case for the amplitude modulation to be set to ca. 15–25% of the amplitude modulation degree.

In the further course of the impressing phase, a continuous frequency shift back to f002_hor occurs in the fundamental frequency in conjunction with an AM degree that remains constant or is adapted to the condition of continuous operation (18–30%, preferably 20–25%) toward the excitation frequency that is yielded in a horizontal operating position. The rate of the frequency shift in the fundamental frequency is 0.5 to 15 kHz; preferably it is typically at 1 kHz/sec and is not faster than 10 kHz/sec.

In a further embodiment, the resonance for the horizontal operating position is also forced into a vertical operating position by increasing the AM modulation degree up to 45% in steps or continuously after a warm-up phase of preferably ca. 75–150 seconds with the fundamental frequency held constant at the frequency point f002_hor. The rate of increase of the AM degree is intended not to exceed a specific rate of rise (typically <40%/sec).

After an impressing phase of ca. >20–60 seconds in conjunction with an increased AM degree, the AM degree can be set more or less abruptly to the state of continuous operation, specifically of ca. 20–25%. The setting of this AM degree is not subjected to any rate limitation. The AM degree can therefore be changed (preferably reduced) instantaneously (within 0.1 second) or with a high rate of change.

Attainment of the $2^{nd}$ horizontal longitudinal resonance is likewise reliably forced via this procedure.

The invention also includes combinations of these two methods, and the implementation of the method in a ballast. The time ranges up to the beginning of the procedures described, that is to say the effective changes in the frequencies and AM degrees are determined by the power coupling of the ballast in the start-up phase. The specified time periods can be shortened by up to 50% given a raised power input after the start of the arc discharge. The time phase can also be raised to 200% in the case of applications with burner vessels having a high thermal capacity. Furthermore, it is possible to run through the change cycles of frequency and AM degree several times.

A starting or discontinuing criterion for the type of high-pressure lamp to be operated can be set in defined fashion via automatic measurements of the operating voltage and impedance of the lamp.

In addition to the method, the invention includes ballasts in which the procedures described are implemented.

BRIEF DESCRIPTION OF THE DRAWINGS

The aim below is to explain the invention in more detail with the aid of a plurality of exemplary embodiments. In the drawing.

BEST MODE FOR CARRYING OUT THE INVENTION

Figure 1:
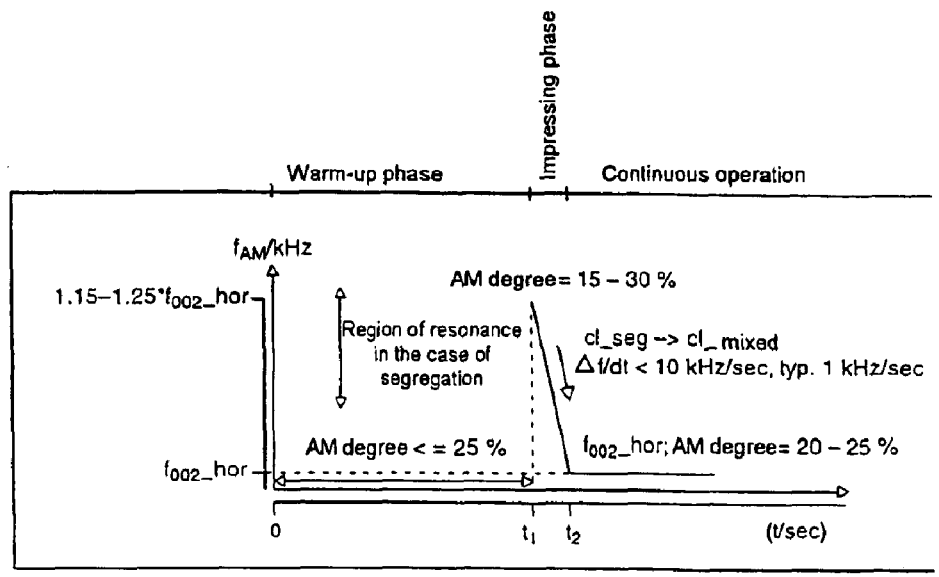
FIG. 1 shows a schematic cycle of the start up of a high-pressure lamp.

FIG. 1 shows the schematic operating procedure for setting up an improved mixing state in the case of a universal operating position and, in particular, in the case of a vertical operating position by means of AM frequency shifting in the start-up phase. The frequency of the amplitude modulation fAM is plotted against time after the lamp is switched on. In a first embodiment, a procedure for settling into the most favorable mixed operating state can be implemented by following the ignition of the arc discharge (t=0) with a warm-up phase (up to instant t1). This warm-up phase lasts at most 75 to 150 s, preferably approximately 60 seconds. In the following impressing phase (from t1 to t2) with a time duration of ca. 1 to 2 minutes, the fundamental frequency fAM of the amplitude modulation AM is set to a value of 1.15 to 1.25 times the frequency f002_hor. Before this, in the warm-up phase, the frequency fAM can be selected at will, but it is preferred to preset f002_hor. The AM degree can also be set at will in the warm-up phase in a range from 0 to 25%. Thereafter, the fundamental frequency is increased abruptly at the instant t1, preference being given in this case to a frequency raised by 18–20% by comparison with f002_hor. At the instant of the raising of the fundamental frequency in the impressing phase, the AM degree is set to 15 to 30%. It is preferred in this case for the amplitude modulation to be set to ca. 15–25%, preferably to 20 to 25%, of the amplitude modulation degree.

In the further course of the impressing phase, the fundamental frequency fAM is continuously lowered back to f002_hor, in conjunction with an AM degree that remains constant or is adapted to the condition of continuous operation (18–30%, preferably 20–25%) toward the excitation frequency that is yielded in a horizontal operating position. The rate of the frequency shift in the fundamental frequency ($\Delta f/dt$) is 0.5 to 15 kHz/sec, preferably it is typically at 1 kHz/sec, and is not faster than 10 kHz/sec.

Figure 2:
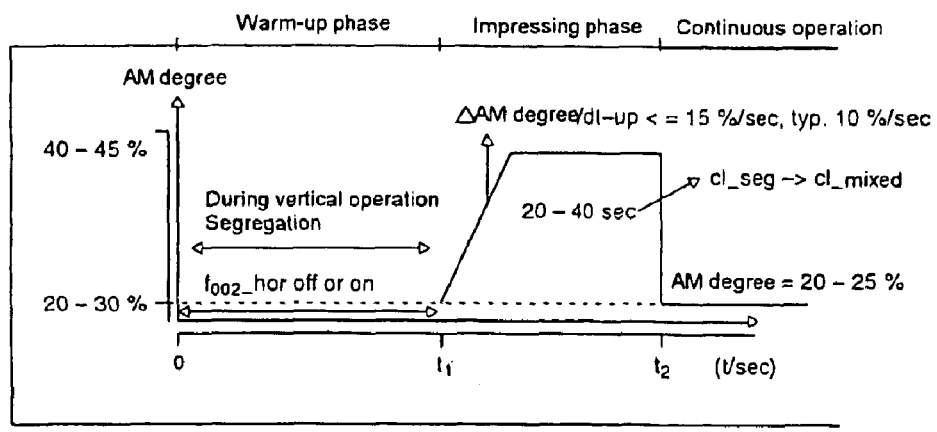
FIG. 2 shows a further exemplary embodiment for a schematic cycle.

FIG. 2 shows an alternative schematic operating procedure for setting an improved mixing state in conjunction with a universal operating position and, in particular, a vertical operating position by means of changing the AM modulation degree in the start-up phase. After a warm-up phase up to the instant t1 (preferably ca. 75–150 seconds) with the fundamental frequency held constant at the frequency point f002_hor (or entirely without amplitude modulation) with an AM degree of less than 30%, the resonance for the horizontal operating position is also forced into a vertical operating position by increasing the AM modulation degree up to 45% in steps or continuously. The rate of increase of the AM index is intended not to exceed a rate of rise of 15%/sec (typically 10%/sec).

After an impressing phase of 20 to 60 seconds overall in conjunction with an increased AM degree, the AM degree can be set more or less abruptly to the state of continuous operation, specifically of ca. 20–25%. The setting of this AM degree is not subjected to any rate limitation. The AM degree can therefore be changed (preferably reduced) instantaneously (within 0.1 second) or with a high rate of change.

Attainment of the $2^{nd}$ horizontal longitudinal resonance is likewise reliably forced via this procedure.

In a first exemplary embodiment of the lamp, the latter has a ceramic discharge vessel with the filling components of iodides of sodium, cerium and calcium in the ratio of $NaI:CeI_3:CaI_2=70:10:20$ mol % with a total mass of 5 mg and an Hg filling of 4.5 mg.

The discharge vessel has an inner dimension (inner length) of IL=19.2 mm, and an inside diameter ID=4 mm, and is substantially cylindrical over the electrode spacing EA=15 mm. The lamp is operated at a power of 70 W. During vertical operation, after ignition the lamp is operated for 90 seconds in sweep mode between 45–55 kHz with a sweep rate of 85 Hz.

After this warm-up phase, an amplitude modulation of ca. 20% AM degrees is impressed at a frequency of ca. 30 kHz. In the further course of time the frequency is shifted at a rate of change of ca. 1 kHz/sec to the resonant frequency, previously determined in the horizontal operating position, of the $2^{nd}$ longitudinal acoustic natural oscillation of 24.4 kHz in conjunction with a constant amplitude modulation degree. The duration of the procedure is ca. 5.6 seconds. The frequency point of the amplitude modulation, and the modulation degree are retained for further operation. The mixing yields a change in the color temperature from 4 370 K to 3 150 K in conjunction with a change from 95 to 125 lm/W in the lamp light efficiency.

The same lamp as in example 1 is tuned differently into the $2^{nd}$ longitudinal resonance in the second exemplary embodiment. Once again after a warm-up phase of 90 seconds, the AM degree is increased stepwise in 5% steps in values of ca. 5% per second within 8 seconds to an AM degree level of 40% at the specific frequency point for the $2^{nd}$ longitudinal resonant frequency, relevant in the horizontal operating position, of 24.4 kHz, and held there typically for ca. 15–20 seconds. After this phase, the AM degree is lowered to 20% abruptly (within ca. 0.1 second). The duration of the procedure is ca. 23–28 seconds.

The lamp characteristics do not differ in continuous operation from example 2.

Figure 3:
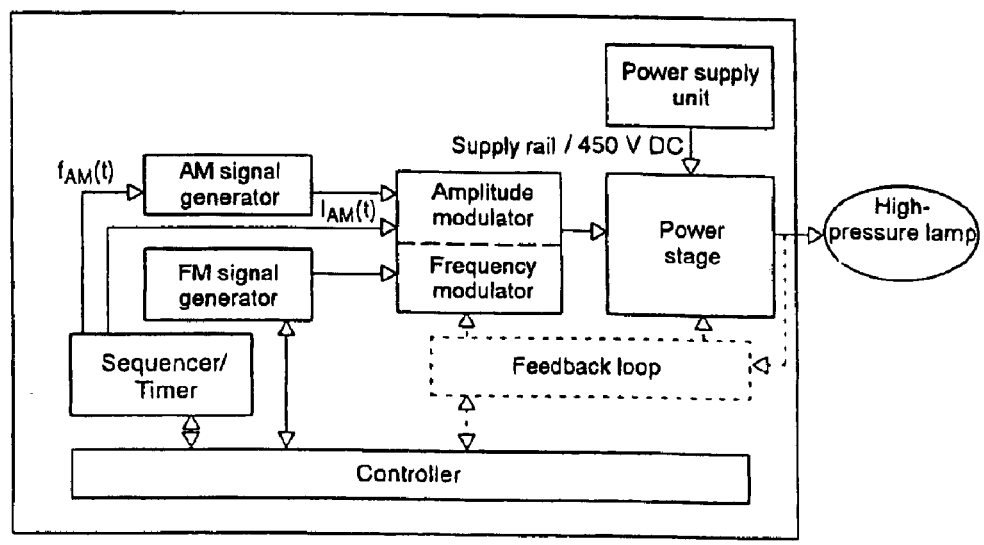
FIG. 3 shows an exemplary embodiment for the principle of the drive circuit.

FIG. 3 shows a block diagram of an associated electronic ballast. It has the following essential components:

Timer/Sequencer: Here, the timing pattern is monitored to control the time duration of the warm-up phase and inception of the impressing phase after igniting the high-pressure lamp and its arc takeover. Moreover, the sweep rate for stabilizing the lamp arc is controlled here.

Power Stage: Full or half bridge with current-limiting elements and typical frequency response. It is coupled to the power supply unit via a supply rail (450 V DC).

Feedback Loop: Lamp mode detection, if appropriate feedback of lamp parameters such as lamp current and lamp voltage in order to set the control parameters and fix the warm-up, impressing phase, or to repeat impressing phases with other tuning parameters.

Lamp: High-pressure discharge lamp (HID lamp)

FM Modulation: High-power frequency modulator

AM Modulator: Analog high-power modulator with the possibility of modulating both in frequency and AM degree $I_{AM}$ AM Signal Generator: Digital or voltage-controlled oscillator FM Signal Generator: Digital or voltage-controlled oscillator Power Supply: Rail voltage generator Controller: Central control of all units

What is claimed is:

1. An operating method and a system for the resonant operation of high-pressure lamps in longitudinal mode, using a high-frequency carrier frequency that is frequency-modulated by means of a sweep signal generator, the frequency of the sweep signal being derived from the first azimuthal and radial modes and being simultaneously amplitude-modulated, a controller setting the fundamental frequency of the AM signal, the fundamental frequency of the AM being derived from the second longitudinal mode, wherein, after the ignition of the lamp, three operating states are passed through sequentially:

a) a warm-up phase, for which f002_hor is selected as fundamental frequency of the AM, or an AM is dispensed with;

b) an impressing phase that is distinguished by a temporally changing AM deviating from the conditions of the continuous operation and having an AM degree different from zero; and c) a continuous operation with constant conditions of the AM, in the case of which the f002_hor is reached as fundamental frequency of the AM, and the AM degree is at 20 to 25%.

2. The operating method as claimed in claim 1, wherein the sweep frequency is kept constant during operation and is in the range between the first azimuthal and radial mode.

3. The operating method as claimed in claim 1, wherein the warm-up phase lasts approximately 30 to 80 seconds, while the impressing phase lasts approximately 60 to 150 seconds.

4. A system composed of a high-pressure discharge lamp and an electronic ballast, having a discharge vessel that contains metal halides, wherein the aspect ratio of the discharge vessel is greater than 1.5, the electronic ballast being suitable for implementing an operating method as claimed in claim 1.

5. An electronic ballast for high-frequency operation of a high-pressure discharge lamp, having a sweep signal generator, an amplitude signal generator, a mixer for the two generators and, a controller for regulating the fundamental frequency of the amplitude modulation signal, wherein the generators are suitable for providing during operation of the lamp a warm-up phase, an impressing phase and a continuous operation in accordance with claim 1.

6. The operating method as claimed in claim 1, wherein during the impressing phase the fundamental frequency of the AM is raised abruptly by 15 to 25% and then returned continuously to the original value f002_hor at a rate of change of 0.5 to 15 kHz/sec.

7. The operating method as claimed in claim 6, wherein the AM degree is set in the range of 15 to 30%.

8. The operating method as claimed in claim 7, wherein the rates of change of the fundamental frequency and AM degree are selected to be equal.

9. The operating method as claimed in claim 1, wherein during the impressing phase the AM degree is stepped up by 50 to 150% by comparison with the AM degree of the continuous operation, at a rate of change of at most 15% per second, followed by maintaining of the selected highest value up to the end of the impressing phase while, in particular, the fundamental frequency remains unchanged.

10. The operating method as claimed in claim 9, wherein the maintaining phase lasts approximately 20 to 40 seconds.

11. The operating method as claimed in claim 9, wherein the following transition to the continuous operation is performed abruptly, preferably within 0.1 seconds.

* * * * *